US010227459B2

(12) United States Patent
Seeger et al.

(10) Patent No.: US 10,227,459 B2
(45) Date of Patent: Mar. 12, 2019

(54) FIBER-PLASTICS COMPOSITES AND COMPOSITION FOR THE PRODUCTION OF THESE FIBER-PLASTICS COMPOSITES

(71) Applicant: BASF Coatings GmbH, Muenster (DE)

(72) Inventors: Dirk Seeger, Oldenburg (DE); Martin Kaune, Oldenburg (DE); Uli Ramm, Osnabrueck (DE)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 15/523,024

(22) PCT Filed: Oct. 27, 2015

(86) PCT No.: PCT/EP2015/074798
§ 371 (c)(1),
(2) Date: Apr. 28, 2017

(87) PCT Pub. No.: WO2016/066605
PCT Pub. Date: May 6, 2016

(65) Prior Publication Data
US 2017/0313830 A1   Nov. 2, 2017

(30) Foreign Application Priority Data

Oct. 30, 2014 (EP) .................................. 14191007

(51) Int. Cl.
| C08J 5/04 | (2006.01) |
|---|---|
| C08J 5/24 | (2006.01) |
| F41H 5/04 | (2006.01) |
| C08G 18/73 | (2006.01) |
| C08G 18/10 | (2006.01) |
| C08G 18/22 | (2006.01) |
| C08G 18/24 | (2006.01) |
| C08G 18/32 | (2006.01) |
| C08G 18/42 | (2006.01) |
| C08G 18/44 | (2006.01) |

(52) U.S. Cl.
CPC .............. *C08J 5/046* (2013.01); *C08G 18/10* (2013.01); *C08G 18/222* (2013.01); *C08G 18/24* (2013.01); *C08G 18/324* (2013.01); *C08G 18/3234* (2013.01); *C08G 18/4236* (2013.01); *C08G 18/44* (2013.01); *C08G 18/73* (2013.01); *C08J 5/04* (2013.01); *C08J 5/24* (2013.01); *F41H 5/0485* (2013.01); *C08J 2369/00* (2013.01); *C08J 2375/00* (2013.01); *C08J 2375/06* (2013.01); *C08J 2469/00* (2013.01); *C08J 2477/06* (2013.01)

(58) Field of Classification Search
CPC .... C08J 5/046; C08J 2477/06; C08J 2375/06; C08J 2469/00
See application file for complete search history.

(56) References Cited

U.S. PATENT DOCUMENTS

| 4,929,667 | A | * | 5/1990 | Ban ........................ | C08G 18/12 |
|---|---|---|---|---|---|
| | | | | | 252/182.22 |
| 5,690,526 | A | | 11/1997 | Lin et al. | |
| 6,964,626 | B1 | | 11/2005 | Wu et al. | |
| 2005/0260375 | A1 | * | 11/2005 | Clarke ................... | C08G 18/10 |
| | | | | | 428/36.9 |
| 2005/0271881 | A1 | * | 12/2005 | Hong ..................... | B82Y 30/00 |
| | | | | | 428/423.1 |
| 2007/0066786 | A1 | * | 3/2007 | Hanson, Jr. ............ | C08G 18/10 |
| | | | | | 528/44 |
| 2007/0167600 | A1 | | 7/2007 | Rukavina et al. | |
| 2007/0194490 | A1 | | 8/2007 | Bhatnagar et al. | |
| 2012/0003891 | A1 | | 1/2012 | Schmidt et al. | |
| 2013/0210997 | A1 | | 8/2013 | Kaune et al. | |
| 2014/0065911 | A1 | | 3/2014 | Schmidt et al. | |
| 2015/0040749 | A1 | | 2/2015 | Bhatnagar et al. | |

FOREIGN PATENT DOCUMENTS

| EP | 0 645 415 A1 | 3/1995 |
|---|---|---|
| JP | 2006-124610 A | 5/2006 |
| WO | 2007/031534 A1 | 3/2007 |
| WO | 2010/108701 A1 | 9/2010 |

OTHER PUBLICATIONS

International Search Report dated Jan. 28, 2016 in PCT/EP2015/074798 Filed Oct. 27, 2015.
International Preliminary Report on Patentability and Written Opinion dated May 11, 2017 in PCT/EP2015/074798 (with partial English translation).

* cited by examiner

*Primary Examiner* — Robert S Jones
(74) *Attorney, Agent, or Firm* — Oblon, McClelland, Maier & Neustadt, L.L.P.

(57) ABSTRACT

The present invention relates to fiber-plastics composites consisting of (I) at least one fiber material and (II) a plastics matrix, where the composite is characterized in that the plastics matrix is based on a two-component matrix material (IIa), where the two-component matrix material (IIa) comprises (1) a parent component comprising (A) at least one polycarbonatediol and (2) a hardener component comprising (C) at least one polyisocyanate-modified polyester with from 4 to 15% isocyanate content. The present invention also relates to a process for the production of the fiber-plastics composites and to use of these.

18 Claims, No Drawings

FIBER-PLASTICS COMPOSITES AND COMPOSITION FOR THE PRODUCTION OF THESE FIBER-PLASTICS COMPOSITES

This application is a National Stage of PCT/EP2015/074798, which was filed on Oct. 27, 2015. This application is based upon and claims the benefit of priority to European Application No. 14191007.5, which was filed on Oct. 30, 2014.

The present invention relates to fiber-plastics composites consisting of at least one fiber material and of a plastics matrix. The present invention also relates to a composition for the production of these fiber-plastics composites. The fiber-plastics composites have excellent resistance to mechanical effects, in particular in relation to high-energy point loading.

PRIOR ART

In various application sectors there is a requirement for materials which meet stringent mechanical requirements. Mention may be made by way of example of the vehicle construction sector, in particular aircraft construction, and the wind turbine sector, in particular in what is known as the offshore sector, because the substrates used in these application sectors, for example rotor blades of wind turbines, have regular exposure to effects such as bird impact and hail impact, and also to typical causes of erosion, for example rain and airborne sand. However, mention may also be made of other sectors in which the resistance described is relevant. Reference may be made by way of example to safety jackets which, in the personal-protection sector, are intended to provide protection from impacts of high-momentum objects such as projectiles.

A feature shared by the application sectors mentioned is the fact that on the one hand the materials used are likely to encounter high-energy point loading, but on the other hand low weight of said materials is a highly relevant factor: it is self-evident that by way of example rotor blades of wind turbines are not permitted to comprise any complicated thick-walled metal layers, since these would constitute an enormous additional weight. The same obviously applies to safety jackets in the personal-protection sector.

In order to achieve good resistance to mechanical loading, in particular high-energy point loading, the appropriate material must provide a number of technological properties. It is of crucial importance that the material used has appropriate flexibility and resilience (toughness with resilience) and, respectively, impact resistance, because a material that is hard but brittle often undergoes spontaneous fracture when it encounters high-momentum point loading. A problem that should not be underestimated is, apart from the actual failure of the material, the resultant danger due to fragments.

The fiber-plastics composites frequently used nowadays because of their comparatively low weight, where the plastics matrix is mostly based on epoxy resin and/or on polyester resin systems, cannot always meet the technological requirements because they are frequently stiff and brittle. Appropriate point loading can cause spontaneous failure, i.e. fracture of the material.

One way of increasing fundamental mechanical stability is to apply specific coatings, frequently with high layer thicknesses, to the actual materials. However, in many application sectors this is not desirable, for the weight-related reasons mentioned above. Furthermore, specifically in the case of high-momentum point loading the properties of the material itself are more important than the properties of the coating, because the latter is hardly capable of resisting an impacting high-momentum object.

Nor is the reinforcement of fiber-plastics composites by metal structures, which in principle have very high mechanical stability, an acceptable alternative, because the metals have high density, and this increases weight, as already described above.

OBJECT

It was therefore an object of the present invention to eliminate the disadvantages described above of the prior art. The intention was to provide fiber-plastics composites which have excellent stability in relation to mechanical effects, in particular in relation to high-momentum point loading. The intention was thus to provide materials which combine high mechanical stability with acceptable weight, and which therefore permit effective use in sectors such as vehicle construction, in particular aircraft construction, wind turbines, in particular in what is known as the offshore sector, or else personal protection.

ACHIEVEMENT OF OBJECT

Accordingly, fiber-plastics composites have been found, consisting of
  (I) at least one fiber material and
  (II) a plastics matrix,
wherein the plastics matrix is based on a two-component matrix material (IIa), where the two-component matrix material (IIa) comprises
  (1) a parent component comprising
     (A) at least one polycarbonatediol
  and
  (2) a hardener component comprising
     (C) at least one polyisocyanate-modified polyester with from 4 to 15% isocyanate content.

The novel fiber-plastics composites are provided by the present invention, and hereinafter are also termed fiber-plastics composites of the invention. Preferred embodiments are found in the description below and in the dependent claims.

The present invention also provides a composition for the production of fiber-plastics composites of the invention, and a process for the production of the fiber-plastics composites with use of said composition. The present invention also provides components which comprise the fiber-plastics composites of the invention or which consist thereof. The present invention also provides the use of the fiber-plastics composites of the invention for improving mechanical stability, in particular stability in relation to high-energy point loading, of components.

The fiber-plastics composites of the invention have excellent mechanical stability in particular in relation to high-energy point loading, and accordingly can be used particularly effectively in sectors where the combination of high mechanical stability and comparatively low weight is particularly relevant.

DESCRIPTION OF THE INVENTION

The fiber-plastics composite (also termed fiber-composite material) of the invention is, in accordance with the widely applied definition, a material which consists of at least two different materials or main components. Alongside the at least one fiber material always present there is also a plastics matrix present, and as is known in these fiber-plastics composites the fiber material has been embedded into the plastics matrix. The plastic therefore takes the form of matrix surrounding the fibers, or represents the matrix for the fibers embedded therein.

Fiber materials that can be used are any of the materials known per se for use in fiber-plastics composites. Examples of those that can be used are glass fibers, carbon fibers, ceramic fibers, aramid fibers, basalt fibers, steel fibers, nylon fibers, or natural fibers, for example sisal fibers. It is preferable to use aramid fibers. As is known, aramid fibers consist of linear, aromatic polyamides. Reference may be made by way of example to the polymer obtainable via a condensation reaction of terephthaloyl dichloride and para-phenylenediamine.

The fibers can be used per se, i.e. in the form of short, long, or continuous-filament fibers known per se. However, for the purposes of the present invention it is not only possible but also preferable to use semifinished fiber products. When the semifinished fiber products are compared with the individual fibers or fiber filaments, i.e. fibers per se, they have the advantage of substantially easier handling. They are produced by way of example via weaving or braiding of fibers or fiber filaments. These semifinished products known per se are by way of example woven fabrics, laid scrims, mats, or nonwovens.

The plastics matrix of the fiber-plastics composites of the invention is based a two-component matrix material which is described in detail at a later stage below. The meaning of the fact that the plastics matrix is based a two-component matrix material is provided below, and will also be explained with reference to the production process for fiber-plastics composites.

The matrix material is a two-component matrix material. This means, as is known, that for the purposes of the present invention the component (1) (parent component) as described below and the component (2) (hardener component) as described below are produced and stored separately from one another, and are combined only shortly before processing. The pot life (i.e. the time during which, at room temperature (from 15 to 25° C., in particular 20° C.) the two-component matrix material can be processed without any viscosity increase such that useful processing is no longer possible, caused by way of example by appropriate cross-linking reactions at room temperature) is known to depend on the constituents used, these being described at a later stage below, which contribute to the abovementioned cross-linking or curing process. A two-component matrix material that is originally fluid therefore always comprises constituents which can cross-link with one another, or can harden. The pot life of the two-component matrix material is with particular preference from 4 to 25 min., with still more preference from 6 to 12 min., where this pot life can also be influenced within certain limits via the quantity of cross-linking catalysts, as described at a later stage below, and the use of, or specific omission of, by way of example, chelating agent(s) for said cross-linking catalysts, which can influence the reaction rate by blocking of the catalyst. The particular advantage of this two-component matrix material is that easy processing is possible even in the case of large components such as rotor blades of wind turbines, and in particular no high temperatures are required for the curing process. The temperature at which the matrix material to be used in the invention is cured is preferably not more than 80° C., preferably no more than 60° C., with particular preference from 15 to 60° C.

The term hardening or curing means the procedure known to the person skilled in the art, i.e. the conversion of a composition that is still fluid or at least still highly viscous or tacky to the ready-to-use state, i.e. to a state in which it is possible to transport and store the resultant product, and to use same in the prescribed manner. In the case of a two-component matrix material, said curing in particular takes place via chemical reaction (the abovementioned cross-linking) of reactive functional groups of the constituents present as binder constituents in the matrix material. For the purposes of the present invention, particular mention may be made in this connection of the reactions of the hydroxy groups of the polycarbonate (A) described below and of the amino groups of the diamine (B) described below with the isocyanate groups of the polyisocyanate-modified polyester (C) described below. These cross-linking reactions, and the evaporation that takes place in parallel of optionally present solvents achieves curing, and forms a plastics matrix.

The production of fiber-plastics composites in which the plastics matrix is based on these cross-linking matrix materials comprises (i) bringing the matrix material into contact with the fiber material, for example, via mixing of the materials and/or impregnation of the fibers or semifinished fiber products with the matrix material and (ii) then forming the plastics matrix via curing of the matrix material. The abovementioned cross-linking of the matrix material constituents set out at a later stage below takes place during this curing process.

The activation required for the cross-linking reactions is generally achieved thermally, i.e. the required energy can be introduced into the system via simple introduction of heat. However, the advantage of a two-component matrix material such as the matrix material to be used in the invention consists, as described above, especially in that high temperatures are not required for the curing process. It is preferable that the temperature at which the matrix material to be used in the invention is cured, after contact with the fiber material, is no more than 80° C., preferably no more than 60° C., with particular preference from 15 to 60° C., because the reactivity of the matrix material constituents that cross-link with one another, these being described at a later stage below, is so great that thermal activation is achieved, and curing is thus possible, at temperatures as low as those mentioned.

The curing time required can vary greatly, depending on the selected curing conditions, in particular curing temperatures. Curing is, of course, achieved more rapidly at higher curing temperatures.

There are typical production processes that are known for fiber-plastics composites comprising the steps (i) and (ii) described above, i.e. (i) bringing the matrix material into contact with the fiber material and (ii) then forming the plastics matrix via curing of the matrix material.

For the purposes of the present invention, the production process can by way of example use manual lay-up processes, optionally in combination with vacuum pressing, or can proceed by way of the prepreg process or the vacuum infusion process. These processes are particularly suitable for the production of fiber-plastics composites in the form of laminates, where the fiber-plastics composite comprises layers with their large surfaces bonded to one another, for example via use of semifinished fiber products such as fiber mats.

It is also possible to produce the fiber-plastics composites via injection-molding processes, for example by the transfer molding process, or by the pultrusion process. These processes are clearly suitable for the production of fiber-plastics composites and complex-shaped components consisting thereof.

It is also possible to produce the fiber-plastics composites in the form of the sheet molding compounds (SMCs) known per se. Here, fiber mats which have been impregnated with matrix material and in which the matrix material has already been converted via controlled precross-linking into a highly viscous, wax-like state are pressed with one another in heatable molds, whereupon the matrix material cures and the plastics matrix is thus formed.

All of the processes mentioned are known per se and do not require explanation in any further detail.

From what has been said above it follows that the plastics matrix of the fiber-plastics composites of the invention is formed via curing of the two-component matrix material. The plastics matrix is therefore based on this same two-component matrix material. The expression "the plastics matrix is based on the two-component matrix material" therefore means the same as the expression "the plastics matrix can be produced via curing of the two-component matrix material".

The components of the invention which consist of, or comprise, a fiber-plastics composite of the invention can in each case per se have any desired size, form, and design. They are preferably components that have to have excellent stability in relation to mechanical effects, in particular in relation to high-momentum point loading, in order to comply with the respective range of technological requirements demanded. Examples of preferred components are rotor blades of wind turbines, vehicle components, and safety jackets.

The matrix material to be used in the invention is described below.

This is a two-component matrix material comprising a parent component and a hardener component. The constituents which, as described above, can cross-link with one another and thus contribute to the curing process are in particular polycarbonatediols (A), diamines (B) and polyisocyanate-modified polyesters (C).

The two-component matrix material comprises at least one polycarbonatediol (A) in the parent component (1).

Polycarbonatediols are formally esterification products which can be produced via reaction of carbonic acid with polyols. In practice, as is known, the carbonate structures are introduced with the aid of phosgene or carbonic diesters under familiar reaction conditions. The reaction with diols, for example with 3-methyl-1,5-pentanediol or 1,6-hexanediol, then leads to the polycarbonatediols. These polycarbonatediols can, of course, comprise not only the carbonate functions that bond the starting components but also some content of other functional groups, for example ester groups or ether groups, depending on the nature and quantity of the starting compounds used. It is preferable that the polycarbonatediol is a linear polycarbonatediol. It is preferable that the hydroxy groups are terminal, i.e. arranged at the two ends of the preferably linear polycarbonatediol (hydroxyl-terminated polycarbonatediol). It is very particularly preferable that the material is an aliphatic polycarbonatediol. The polycarbonatediol therefore preferably comprises no aromatic groups, because these have very limited UV resistance.

The OH number of the polycarbonatediols (A), in particular of the linear, aliphatic polycarbonatediols, is preferably from 50 to 500 mg KOH/g, preferably from 100 to 400 mg KOH/g, in particular from 150 to 250 mg KOH/g (measured in accordance with DIN 53240). When reference is made to an official standard for the purposes of the present invention, the intended standard is of course the version valid at the filing date or, if no valid version exists at that date, the most recent valid version.

Since the polycarbonates (A) are components of diol type, the OH number and the number-average molecular weight of the components are mutually dependent, or the stated OH number can provide information about the number-average molecular weight. A high number-average molecular weight would be associated with a relatively low OH number. The number-average molecular weight can vary widely, and is in the region of, by way of example, from 220 g/mol to 2250 g/mol (measured by means of GPC analysis with THF (+0.1% of acetic acid) as eluent (1 ml/min) on a styrene-divinylbenzene column combination, with polystyrene standards for calibration).

Suitable polycarbonatediols (A) are supplied by way of example in the following product lines: DURNOL™ (Asahi Kasei), Desmophen®, from Bayer MaterialScience AG (Leverkusen, Germany), or Eternacoll® (UBE).

The proportion of the polycarbonates (A) is preferably in the range from 10 to 70% by weight, with preference from 15 to 60% by weight, with particular preference from 20 to 50% by weight, based in each case on the total weight of the matrix material to be used in the invention.

It is preferable that the parent component (1) of the two-component matrix material comprises at least one aliphatic, aromatic, or araliphatic (mixed aliphatic-aromatic) diamine (B) having primary and/or secondary amino groups.

In particular, the addition of this diamine (B) and the combination thereof with a polycarbonatediol (A) and with a polyisocyanate-modified polyester (C) gives a plastics matrix which in combination with fibers leads to a fiber-plastics composite with greatly improved mechanical stability.

The amino groups can be primary and/or secondary. The material therefore comprises two primary amino groups, two secondary amino groups, or one primary and one secondary amino group. Preference is given to secondary amino groups.

The amine number of the diamines (B) is preferably from 300 to 500 mg KOH/g, more preferably from 350 to 450 mg KOH/g, in particular from 380 to 430 mg KOH/g (measured by means of DIN EN ISO 15880).

Since the diamines (B) are components having precisely two amino groups, the amine number and the molecular weight of the components are mutually dependent, or the stated amine number can provide information about the molecular weight. A high molecular weight would be associated with a relatively low amine number.

Typical araliphatic diamines (B) which can be used for the purposes of the present invention are by way of example the diamines obtainable with trade name Ethacure®, in particular 3,5-diethyltoluene-2,4-diamine and/or 3,5-diethyltoluene-2,6-diamine.

However, it is preferable for the purposes of the present invention to use diamines (B) which have secondary amino groups and which have an aliphatic group (b1) between the nitrogen atoms of the amino groups.

A preferred diamine of this type always has secondary amino groups as functional groups. Accordingly, it comprises only secondary amino groups, specifically precisely two secondary amino groups.

The advantage of the secondary amino groups consists in particular in the improved, i.e. slightly extended, pot life of the two-component matrix material. Although the good performance characteristics achieved are exactly the same as those achieved when primary amines are used, the implication of the longer pot life is that these preferred systems also have a significant technical advantage.

As is known, secondary amino groups have precisely one hydrogen moiety on the nitrogen atom. There are moreover two appropriate organic moieties (or organic groups) $R_1$ and $R_2$ present, bonded to the nitrogen by way of a carbon atom. These organic moieties $R_1$ and $R_2$ can then be selected as desired, as long as the amine character is retained. It is possible by way of example to use alkyl groups, aryl groups, and alkenyl groups, which can also have substitution, i.e. which can comprise, instead of hydrogen bonded to carbon at the relevant positions, various other functional groups such as hydroxy groups or nitrile groups. As is known, it would not be possible to use an acyl group in alpha-position to the nitrogen atom, because the compound would then be an amide rather than an amine.

The organic moieties $R_1$ and $R_2$ of a secondary amino group can, of course, also comprise bridging heteroatoms and/or bridging groups comprising heteroatoms, as long as the amine character is retained. Examples that may be mentioned are ether linkages and ester linkages.

An organic moiety $R_1$ or $R_2$ as described can, of course, also be arranged between two nitrogen atoms of two amino groups. In a resultant diamine by way of example this moiety is then an organic moiety for the two amino groups. This is the case by way of example for the moiety (b1) in the diamine (B) to be used in the invention.

There is an aliphatic group (b1) arranged between the nitrogen atoms of the secondary amino groups of the preferred diamine.

As is known, aliphatic compounds are acyclic or cyclic, impregnated or nonimpregnated hydrocarbon compounds which are not aromatic or which comprise no aromatic content of any kind. The expression aliphatic compound therefore comprises acyclic and cyclic aliphatics (cycloaliphatics), and is also applied as appropriate generic expression for the purposes of the present invention. Acyclic aliphatics can be linear or branched. As is known, the meaning of linear in this context is that the respective compound has no branching in respect of the carbon chain, and that instead the arrangement of the carbon atoms in a chain is exclusively in a linear sequence. The meaning of branched or nonlinear for the purposes of the present invention is therefore that the respective compound under consideration has branching in the carbon chain, i.e. differs from the linear compounds in that at least one carbon atom in the respective compound is a tertiary or quaternary carbon atom. The expression cyclic aliphatics or cycloaliphatics is used for those compounds in which the linkage of at least some of the carbon atoms present in the molecule is such as to form one or more rings. Alongside the one or more rings there can, of course, be other acyclic linear or branched aliphatic groups present in a cycloaliphatic.

Accordingly, an aliphatic group (or an aliphatic moiety, the terms group and moiety being used as equivalents) is a group which complies with the abovementioned preconditions for aliphatic compounds, but is only a portion of a molecule: the (clearly divalent) aliphatic group (b1) between the nitrogen atoms of the amino groups in the diamine (B) is clearly only a portion of the entire molecule. The nitrogen atoms and the two other organic moieties of the two secondary amino groups are also present.

Examples of aliphatic groups are linear, branched, and cyclic alkyl groups.

The aliphatic groups (b1) are preferably impregnated groups. They can then be impregnated acyclic and cyclic aliphatic groups. The aliphatic groups (b1) preferably have from 4 to 30 carbon atoms, in particular from 6 to 18 carbon atoms. Particular preference is given to cyclic aliphatic groups (b1), in particular those having from 6 to 18 carbon atoms. A very particularly preferred aliphatic moiety (b1) has the following formula (FI).

(FI)

This moiety can be introduced via use of the corresponding primary diamine isophoronediamine in a process as described below for producing the preferred diamine (B).

Linked to the two nitrogen atoms of the preferred diamine (B) there is not only the divalent moiety (b1) and the hydrogen that is always present but also in each case another organic moiety (b2). These moieties can per se be selected, mutually independently, as desired, as long as the amine character is retained. They can accordingly be optionally substituted aliphatic, aromatic, or araliphatic moieties/groups. An araliphatic group is a group having not only aliphatic but also aromatic content. It is preferable that the moieties (b2) are not aromatic or comprise no aromatic content. It is therefore particularly preferable that the amines (B) are entirely free from any kind of aromatic group or content.

It is preferable that the moieties (b2) are optionally substituted alkyl groups. An example of an unsubstituted alkyl group is a methyl or ethyl group. An example of a substituted alkyl group is an ethyl group in which a nitrile group replaces a hydrogen atom. An example that may be mentioned is the —$CH_2CH_2$—CN moiety. Another example would be an alkyl moiety bonded by way of an ester linkage to another alkyl moiety. An example that may be mentioned is the substituted moiety —$CH_2CH_2$—C(O)—O—$CH_3$. The optionally substituted alkyl groups preferably comprise from 2 to 10, in particular from 2 to 4, carbon atoms in alkyl units. By way of example, the —$CH_2CH_2$—CN moiety comprises two carbon atoms in alkyl units. The —$CH_2CH_2$—C(O)—O—$CH_3$ moiety comprises three such carbon atoms, because one carbon atom is present in an ester linkage rather than in an alkyl unit.

The preferred diamines (B) can be produced in a simple and efficient manner described in more detail at a later stage below by the reaction of primary diamines (comprising two primary amino groups and, arranged therebetween, an aliphatic group (b1)) with acrylic acid derivatives via a nucleophilic addition reaction known per se of the amine onto the carbon-carbon double bond of the acrylic group of the acrylic acid derivative. As is known, realization of this type of nucleophilic reaction requires maximization of electron-withdrawing effect on the carbon-carbon double bond. This is achieved in particular by using acrylonitrile or acrylic esters, in particular $C_1$-$C_6$-alkyl esters, preferably methyl acrylate and ethyl acrylate. Very particular preference is given to acrylonitrile.

From what has been said above it follows that the moieties (b2) are preferably selected from the group consisting of —$CH_2CH_2$—CN and —$CH_2CH_2$—C(O)—O—$C_nH_{2n+1}$, where n=from 1 to 6, preferably n=from 1 to 2, because it is specifically these moieties (b2) that result when the preferred acrylic acid derivatives are used in the nucleophilic addition reaction. Very particular preference is given to the —CH2CH2-CN moiety.

Particularly preferred diamines (B) can therefore be described via the following formula (FII):

(b2)-NH-(b1)-NH-(b2)    (FII)

where
(b1)=aliphatic group having from 4 to 30 carbon atoms, with particular preference cyclic aliphatic group having from 6 to 18 carbon atoms, very particularly preferably aliphatic group of the formula (I),
(b2)=mutually independently —CH$_2$CH$_2$—CN and/or —CH$_2$CH$_2$—C(O)—O—C$_n$H$_{2n+1}$, where n=from 1 to 6, preferably —CH$_2$CH$_2$—CN.

The amine number of the preferred diamines (B) is preferably from 300 to 500 mg KOH/g, in particular from 350 to 450 mg KOH/g (measured by means of DIN EN ISO 15880).

The production of these preferred diamines (B) can proceed in a manner known per se, for example via a nucleophilic addition reaction of two equivalents of acrylic acid derivative onto one equivalent of diamine having two primary amino groups. This type of production process is described by way of example in the laid-open specification WO 2007/031534 A1.

It is therefore preferable that these diamines (B) are produced by way of the nucleophilic addition reaction of acrylic derivatives onto primary diamines. It is preferable here to use the abovementioned acrylic derivatives, specifically acrylonitrile and/or acrylic esters, in particular C$_1$-C$_6$-alkyl esters. The selection of the primary diamines is preferably such that, after the reaction, the diamine (B) comprises the abovementioned preferred aliphatic groups (b1). Amines that may be mentioned by way of example are: isophoronediamine, 3,3'-dimethyl-4,4'-diaminodicyclohexylmethane, 4,4'-diaminodicyclohexylmethane, 4,4'-diaminodiphenylmethane, hexamethylenediamine and 2-methylpentamethylenediamine. Preference is therefore given to isophoronediamine, 3,3'-dimethyl-4,4'diaminodicyclohexylmethane, 4,4'-diaminodicyclohexylmethane, hexamethylenediamine and 2-methylpentamethylenediamine. Very particular preference is given to the cycloaliphatic primary diamines mentioned, in particular isophoronediamine. This primary diamine clearly comprises the very particularly preferred moiety (b1) of the formula (I).

The proportion of the diamines (B), preferably of the diamines (B) which have secondary amino groups and which have an aliphatic group (b1) between the nitrogen atoms of the amino groups, is preferably in the range from 0.7 to 7.0% by weight, with preference from 1.0 to 6.0% by weight, with particular preference from 1.5 to 5.0% by weight, based in each case on the total weight of the matrix material to be used in the invention.

The two-component matrix material comprises, specifically in the hardener component (2), at least one polyisocyanate-modified polyester (C) with from 4 to 15% isocyanate content.

Polyesters are known. They are polymeric resins which are produced by reaction of polyhydric organic polyols and polybasic organic carboxylic acids. The polyols and polycarboxylic acids here are linked to one another by esterification, i.e. by condensation reactions. These give by way of example linear or branched products, as determined by the nature and functionality of the starting components and the proportions and ratios used of these. While linear products are mainly produced when difunctional starting components (diols, dicarboxylic acids) are used, branching is achieved by way of example by using alcohols of higher functionality (OH functionality, i.e. number of OH groups per molecule, greater than 2). The production process can also, of course, use a proportion of monofunctional components, for example monocarboxylic acids. As is known, the production of polyesters can also use, instead of or alongside the appropriate organic carboxylic acids, the anhydrides of the carboxylic acids, in particular the anhydrides of the dicarboxylic acids. It is likewise possible that the production process uses hydroxycarboxylic acids, or the lactones derived via intramolecular esterification from the hydroxycarboxylic acids.

It is preferable that the polyester to be modified is a polylactone polymer, i.e. a polymer that is generally produced via ring-opening polymerization of lactones, for example in particular epsilon-caprolactone. This process generally uses organic alcohols, mostly diols, as initiator or catalyst. When diols are used the resultant polylactone polymer then has two terminal hydroxy groups. However, the polymer always has a hydroxy group produced via the final ring-opening. These polyesters are therefore linear-aliphatic, impregnated polyesters having at least one hydroxy group. Suitable lactones for the production of the polylactone polymer are beta-propiolactone, gamma-butyrolactone, gamma-valerolactone, epsilon-caprolactone, and methyl-epsilon-caprolactone, preferably gamma-butyrolactone and epsilon-caprolactone, particularly preferably epsilon-caprolactone. Suitable initiator alcohols are neopentyl glycol, ethylene glycol, diethylene glycol, and trimethylolpropane.

It is accordingly preferable that the polyester to be modified is a linear-aliphatic polyester containing hydroxy groups, preference being given among these to an impregnated polyester. It is very particularly preferable that the polyester to be modified is a polycaprolactone polymer.

The polyester, in particular the linear-aliphatic, impregnated polyester having at least one hydroxy group, particularly preferably the polycaprolactone polymer, has been polyisocyanate-modified, and has from 4 to 15% isocyanate content.

This means that the polyester described above, to be modified, has been modified with a polyisocyanate, i.e. is reacted with formation of covalent bonds, but that free isocyanate groups always remain available after the reaction. It is particularly preferable to use a diisocyanate for the modification process. Clearly, therefore, the polyester must comprise functional groups, for example hydroxy groups or amino groups, that are reactive toward isocyanate groups. From what has been said above it follows that these are preferably hydroxy groups. In this case, there is then linkage by way of a urethane group between the polyisocyanate and the polyester after the reaction. The appropriate reactions and reaction conditions are in principle known.

Polyisocyanates to be used for the modification process can be the compounds known per se, for example aliphatic and aromatic polyisocyanates, in particular diisocyanates and their dimers and trimers, for example uretdiones and isocyanurates. Reference may be made by way of example to hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, and 2,4- or 2,6-diisocyanato-1-methylcyclohexane, diisocyanates or mixtures made from these polyisocyanates, and to the dimers and/or trimers known per se derived from the polyisocyanates mentioned, i.e. by way of example uretdiones and isocyanurates of the abovementioned polyisocyanates. It is preferable to use aliphatic polyisocyanates, in particular aliphatic diisocyanates. In particular, it is preferable to use no aromatic polyisocyanates. A particularly preferred polyisocyanate is hexamethylene diisocyanate (HDI).

The isocyanate content of the polyisocyanate-modified polyester is from 4 to 15%, preferably from 5 to 12%, with particular preference from 6 to 10%. The isocyanate content is determined for the purposes of the present invention in accordance with DIN EN ISO 11909 via reaction of the respective sample with excess dibutylamine and back-titration of the excess with hydrochloric acid, using bromophenol blue.

The weight-average molecular weight of component (C) is by way of example in the range from 500 to 10 000 g/mol, for example in particular from 1000 to 4000 g/mol.

Appropriate products are obtainable commercially, for example in solvent-free form or in the form of solution in solvents that are known per se and described at a later stage below, and these products can readily be used in the hardener component of the matrix material to be used in the invention. Reference may be made by way of example to products with trademarks Tolonate™ (Vencorex), Desmodur® (Bayer) or Adiprene® (Chemtura).

The proportion of the at least one polyisocyanate-modified polyester (C) is preferably in the range from 20 to 80° by weight, with preference from 30 to 75° by weight, with particular preference from 40 to 70% by weight, based in each case on the total weight of the matrix material to be used in the invention.

The matrix material of the invention can comprise, as further constituents, a very wide variety of constituents known in this context to the person skilled in the art in the relevant sector.

However, the total proportion made up by components (A) and (C) is preferably at least 60° by weight, particularly preferably at least 70% by weight, more preferably at least 80% by weight, and among these values preferably at least 85° by weight, based on the total weight of the matrix material.

The matrix material can comprise organic solvents and/or water. Organic solvents are aliphatic and/or aromatic hydrocarbons such as toluene, xylene, solvent naphtha, Solvesso 100, or Hydrosol® (ARAL), ketones, for example acetone, methyl ethyl ketone, or methyl amyl ketone, esters, for example ethyl acetate, butyl acetate, butyl glycol acetate, pentyl acetate, methoxypropyl acetate, or ethyl ethoxypropionate, ethers, alcohols, chlorinated hydrocarbons, or a mixture made of the abovementioned solvents.

However, it is particularly advantageous that the matrix material of the invention can be produced in solvent-free form. The other constituents present nevertheless permit processing as described at an earlier stage above. The matrix material thus also has high environmental value, in particular through avoidance of organic solvents. The expression "solvent-free" is known in principle to the person skilled in the art. It preferably means that the matrix material comprises less than 10% by weight of organic solvents. The quantity of organic solvents present is preferably less than 7.5% by weight, particularly preferably less than 5% by weight, very particularly preferably less than 2.5% by weight. The data are based in each case on the total weight of the matrix material. It is therefore preferable that there is no explicit addition of organic solvents in order by way of example to achieve appropriate values for the viscosity of the material. Specifically, then, organic solvents are used in small quantities, if at all, in the matrix material only by virtue of the use of, for example, typical additives which can sometimes be purchased in solution in organic solvents. It is also preferable that the matrix material comprises no water or only subordinate quantities of water (anhydrous). The quantity of water present is particularly preferably less than 1.0% by weight, preferably less than 0.2% by weight, more preferably less than 0.01% by weight, based on the total weight of the matrix material. It is therefore preferable that, if water is used at all in the material, it is used only by virtue of the use of, for example, typical additives.

The matrix material to be used in the invention can also comprise, alongside the at least one polyisocyanate-modified polyester (C) with from 4 to 15% isocyanate content, at least one other component, different therefrom, comprising isocyanate groups. However, the proportion used of component (C) is preferably at least 50% by weight, particularly preferably at least 70% by weight, more preferably at least 90% by weight, based on the total quantity of the components present in the matrix material that comprise isocyanate groups. It is very particularly preferable that component (C) is the only component comprising isocyanate groups.

Other components that can be used, comprising isocyanate groups, are the polyisocyanates known per se, for example aliphatic and aromatic polyisocyanates, in particular diisocyanates and their dimers and trimers for example uretdiones and isocyanurates. Reference may be made by way of example to hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, and 2,4- or 2,6-diisocyanato-1-methylcyclohexane, diisocyanates or mixtures made from these polyisocyanates. It is preferable here to use the dimers and/or trimers known per se that are derived from the polyisocyanates mentioned, i.e. in particular the uretdiones and isocyanurates that are known per se and are also obtainable commercially, derived from the abovementioned polyisocyanates. It is particularly preferable to use aliphatic polyisocyanates. Preferred other polyisocyanates are hexamethylene diisocyanate and isophorone diisocyanate and mixtures thereof, in particular their various trimers and dimers, for example isocyanurates and uretdiones. The isocyanate groups in these components can be free groups or groups blocked by known blocking agents. It is preferable that the isocyanate groups are unblocked (i.e. free). This also applies to the component (C) described above that is essential to the invention. The matrix material therefore preferably comprises only unblocked components comprising polyisocyanate groups, and these are preferably used only in the hardener component. The polyisocyanates mentioned are obtainable commercially. To the extent that the other polyisocyanates are present they are, of course, preferably used in the hardener component. The term polyisocyanate is used for a compound comprising an average of more than one isocyanate group per molecule.

The matrix material to be used in the invention can comprise one molecular sieve or a plurality of molecular sieves. The term molecular sieve is used for natural or synthetic zeolites. As is known, they have a comparatively large internal surface area (about 600 to 700 m²/g), and uniform pore diameters. This gives relatively high adsorption capability. It is preferable that the matrix material comprises from 1 to 10% by weight, based on the total weight of the composition, of at least one molecular sieve. The pore size of suitable molecular sieves is from 2 to 10, preferably from 3 to 4, Angstroms. By way of example, it is possible to use high-porosity aluminum silicates with pore size 3 Angstroms.

The matrix material to be used in the invention can comprise catalysts to catalyze the reaction of hydroxy groups and amino groups with isocyanate groups. It is preferable that the matrix material comprises from 0.01 to 2% by weight, based on the total weight of the composition, of at least one catalyst. With preference, the matrix material to be used in the invention comprises from 0.02 to 1% by weight, based in each case on the total weight of the composition, of at least one catalyst. Suitable catalysts are the known metal catalysts, for example tin catalysts, molybdenum catalysts, zirconium catalysts, or zinc catalysts, and aminic catalysts such as 2-(2-dimethylaminoethoxy) ethanol. Particularly suitable catalysts are zirconium compounds and tin compounds, for example in particular dimethyltin dilaurate or dibutyltin dilaurate, where these are like all of the abovementioned catalysts in that they catalyze a reaction between compounds (C) containing isocyanate groups and the components (A) containing hydroxy groups and optionally present components (B) containing amine groups.

Finally, the matrix materials to be used in the invention can also comprise other constituents differing from the components described above. These constituents comprise by way of example typical additives such as antioxidants, deaerators, wetting agents, dispersing agents, leveling agents, and antifoams, for example those based on polysiloxane, adhesion promoters, for example those based on silane, rheology aids such as thickeners, anti-sag agents and agents with thixotropic effect, waxes and wax-like compounds, biocides, matting agents, free-radical scavengers, light stabilizers, preferably UV absorbers with absorption maximum below 370 nm and/or sterically hindered amines (HALS), corrosion inhibitors, flame retardants, or polymerization inhibitors, or else soluble dyes, pigments, and also other fillers or catalysts. The proportion of these constituents is within the ranges familiar for these, for example from 0.1 to 20% by weight, based on the total quantity of the matrix material.

The solids content of the matrix material can vary with the requirements of each individual case, but it is particularly advantageous that the material can be produced in solvent-free and anhydrous form and can nevertheless be applied in the manner described below. Accordingly, the solids content of the matrix material to be used in the invention is preferably greater than 80%, particularly preferably greater than 85%, and very particularly preferably from 90 to 98% by weight.

Solids content (nonvolatile content) means the proportion by weight that remains as residue when vaporizable content is removed under defined conditions. Solids content is determined in the present application in accordance with DIN EN ISO 3251. For this, vaporizable materials are removed from the composition at 130° C. for 60 minutes.

Unless otherwise stated, this test method can likewise be used in order by way of example to define or predetermine the content of various components or constituents of the matrix material, for example of a polycarbonatediol, based on the total weight of the composition. It is therefore possible to determine the solids content of a dispersion of a component which is to be added to the composition. By taking into account the solids content of the dispersion and the quantity of the dispersion used in the matrix material it is then possible to determine or define the content of the component, based on the entire composition. This determination method can, of course, also be used when by way of example a constituent is purchased and is described by the supplier as solvent-free or anhydrous. In this case the solids content of the commercially available product to be used will by way of example be approximately 100%.

In one preferred embodiment, the matrix material to be used in the invention comprises
(1) in the parent component
(A) from 15.0 to 60.0% by weight of at least one polycarbonatediol,
(B) from 1.0 to 6.0% by weight of at least one diamine which has secondary amino groups and which has an aliphatic group (b1) between the nitrogen atoms of the amino groups
and
(2) in the hardener component
(C) from 30 to 75% by weight of at least one polyisocyanate-modified polyester with from 4 to 15% isocyanate content,
where the weight data are always based on the total weight of the matrix material.

Within this preferred embodiment, all of the advantageous variants described at an earlier stage above, for example in respect of components (A) to (C), are, of course, likewise to be regarded as advantageous. This applies to the combination of the preferred embodiment with only one, or else a plurality, of the advantageous variants described above.

It is preferable that the ratio of the total molar quantity of hydroxy groups and amino groups in the parent component to the molar quantity of isocyanate groups in the hardener component is from 1.0/0.9 to 1.0/1.5. Accordingly, it is particularly preferable that the ratio of the total molar quantity of hydroxy groups of component (A) and amino groups of component (B) in the parent component to the molar quantity of isocyanate groups in the hardener component assumes the value mentioned.

It is preferable that the matrix material comprises exactly one of each of the constituents (A), (B), and (C) mentioned.

All of the preferred embodiments stated are to be regarded as preferred in their own right and in combination with all the other preferred embodiments. The preferred embodiments apply not only to the matrix material to be used in the invention but also to the other subject matter described in the present invention, for example the process which uses the matrix material for the production of fiber-plastics composites.

In the event of any possible specification of matrix materials comprising preferred components, for example preferred diamines (B), in a specific content range, the following rule applies. The diamines (B) not within the preferred group can, of course, still be present in the matrix material. The specific content range then applies only to the preferred group of diamines. However, it is preferable that the specific content range likewise applies to the total content of diamines consisting of diamines from the preferred group and of diamines (B) not within the preferred group.

If, therefore, there were to be a restriction to a content range of from 1.0 to 7.0% by weight and to a preferred group of diamines, this content range clearly applies in the first instance only to the preferred group of diamines. However, it would then be preferable that the total quantity present of all of the diamines (B) originally comprised, consisting of diamines from the preferred group and of diamines (B) not within the preferred group, is likewise from 1.0 to 7.0% by weight. If, therefore, the quantity used of diamines of the preferred group is 6.0% by weight, the quantity that can be used of the diamines (B) of the group not preferred is at most 1.0% by weight.

The principle mentioned applies for the purposes of the present invention to all of the matrix material constituents mentioned and the content ranges of these.

The production of the matrix material to be used in the invention involves no special features, and can use the conventional, known mixing processes and mixing assemblies, for example stirred tanks, stirrer mills, extruders or kneaders. However, a factor requiring consideration here is that the material is a two-component matrix material, and the parent component and the hardener component are produced and stored separately from one another and are then, as described above, combined and mixed only briefly prior to processing of the matrix material. The parent component here generally and preferably comprises, alongside the constituent (A) essential to the invention, a diamine (B) and the additional substances or additives optionally present. The hardener component, which can also comprise other polyisocyanates alongside the constituent (C) essential to the invention, is then admixed with said parent component shortly prior to processing.

Use of the matrix material gives fiber-matrix composites which have excellent stability in relation to mechanical effects, in particular in relation to high-momentum point loading. The present invention therefore likewise provides the use of the fiber-plastics composites of the invention for improving the mechanical stability of components, in particular the stability in relation to high-energy point loading.

It likewise follows from the above that the present invention likewise provides a composition for the production of fiber-plastics composites consisting of at least one fiber material and of a two-component matrix material as described above.

The composition here can be a simple mixture consisting of fibers and two-component matrix material. It is likewise possible that the composition takes the form of semifinished fiber product, for example a fiber mat, wetted or impregnated with the matrix material. The only important factor is that the system involved consists of at least one fiber material and of a matrix material. The ratio by weight of fiber material to matrix material in the composition of the invention can vary with individual requirements and is by way of example from 1:1 to 2.5:1, preferably from 1.1:1 to 2:1.

Examples are used below to illustrate the present invention.

EXAMPLES

1. Production of Fiber-Plastics Composites

The parent components of various matrix materials were first produced by combining the respective constituents and homogeneous mixing in a dissolver (Table 1). Table 1 likewise lists the respective hardener component.

TABLE 1

| Constituent | Parts by weight | | | | | |
|---|---|---|---|---|---|---|
| | A | B | C | D | E | F |
| Parent component | | | | | | |
| Linear, aliphatic polycarbonatediol (A) having terminal hydroxy groups, solvent-free, OH number = 225 | 75.5 | 76.0 | 77.0 | 77.5 | 80.0 | 75.5 |
| Diamine (B)[1] | 6.0 | — | 6.0 | 6.0 | 6.0 | 6.0 |
| Diamine (B)[2] | — | 6.0 | | | | |
| Agent having thixotropic effect | 1.0 | 1.0 | 1.0 | 1.0 | 1.0 | 1.0 |
| Molecular sieve | 4.2 | 4.2 | 4.2 | 4.2 | 4.2 | 4.2 |
| Color pigments | 5.0 | 5.0 | 5.0 | 5.0 | 5.0 | 5.0 |
| Acrylate-based leveling agent | 1.0 | 1.0 | — | 1.0 | 1.0 | 1.0 |
| Blocking agent (chelating agent) for metal catalysts | 4.0 | 4.0 | 4.0 | — | — | 4.0 |
| UV stabilizer additives | 1.8 | 1.8 | 1.8 | 1.8 | 1.8 | 1.8 |
| Zirconium-based catalyst | 0.8 | 0.8 | 0.8 | 3.0 | 1.0 | 1.0 |
| Tin-based catalyst | 0.2 | 0.2 | 0.2 | — | — | — |
| Antifoam | 0.5 | | | 0.5 | | 0.5 |
| Total | 100 | 100 | 100 | 100 | 100 | 100 |
| Hardener component | | | | | | |
| Aliphatic HDI-modified polyester (C) with 8.4% isocyanate content | 175 | 175 | 175 | 175 | 175 | 175 |
| Total | 275 | 275 | 275 | 275 | 275 | 275 |

[1]Adduct made from one equivalent of isophoronediamine and 2 equivalents of acrylonitrile.
[2]Mixture of 3,5-diethyltoluene-2,4-diamine and 3,5-diethyltoluene-2,6-diamine (4:1)

The respective parent components A to F were then mixed homogeneously with the respective hardener components in the quantitative proportions stated in the table, and the resultant matrix material was used directly by way of the manual lay-up process to produce fiber-plastics composites.

For this, compositions for the production of fiber-plastics composites were first produced, specifically by using the respective matrix material to wet fiber mats used as fiber material. Fiber mats used were aramid fiber mats from Saertex (product code B-A-416 g/m²-1270 mm, aramid material: Teijin Twaron 2200 2.420 dtex).

For the actual production of the fiber-plastics composites, the individual wetted mats were first placed on top of one another, and pressed manually together. The total number of wetted mats pressed together was respectively 5, 10 or 20. The fiber-plastics composites were then produced by curing the respective matrix material in the pressed mats at 50° C. for 2 h.

The period between combining a respective parent component and hardener component on the one hand and the lay-up and pressing of the final wetted fiber mat was in each case less than 3 minutes. It was thus possible to achieve problem-free processing of fiber mats which had been wetted with matrix material that was still moist.

The ratio by weight of fiber material to matrix material was always 1.4:1.

By analogy with the above specification, the fiber mats described above were used to produce comparative composites (5, 10 and 20 mats) where a standard two-component matrix material based on an epoxy resin (parent component) and on a polyamine component (hardener component) was used instead of the matrix materials of the invention.

For another comparative system, the abovementioned fiber mats (5, 10 or 20 mats) were placed in layers on one another without any matrix material and fixed between two conventional sheets of material.

The resultant fiber-plastics composites of the invention, comparative composites, and unconsolidated layered mat systems were then subjected to performance testing as described under 2.

2. Performance Testing

The appropriate composites and unconsolidated layered mat systems were introduced into a holder device. A loading test was then carried out. In this, the composites/mat systems were subjected to bombardment with various projectiles from a distance of 10 meters at a bombardment angle of 90° (i.e. frontally). A double determination was carried out in each loading test.

Evaluation:

+=Projectile did not penetrate the composite/the mat system.

o=Projectile almost penetrated the composite/the mat system (noticeable bulge in composite/mat system).

−=Projectile penetrated the composite/the mat system.

Table 2 shows the corresponding results.

TABLE 2

|  | Unconsolidated layered mats Number of mats | | | Comparative composites Number of mats | | | Composites based on matrix material A Number of mats | | |
|---|---|---|---|---|---|---|---|---|---|
| Type of munition | 5 | 10 | 20 | 5 | 10 | 20 | 5 | 10 | 20 |
| .22 lr | +/o | +/+ | +/+ | o/− | +/+ | +/+ | +/+ | +/+ | +/+ |
| 9 × 19 mm Luger | −/− | −/o | +/+ | −/− | −/− | +/+ | −/− | o/+ | +/+ |
| .45 ACP | −/− | +/+ | +/+ | −/− | +/+ | +/+ | +/o | +/+ | +/+ |
| .44 Magnum | −/− | −/− | +/+ | −/− | −/− | +/+ | −/− | +/o | +/+ |
| Cal. 12 (slugs) | −/− | −/− | +/o | −/− | −/− | +/+ | −/− | +/+ | +/+ |
| .223 Remington | −/− | −/− | −/− | −/− | −/− | −/− | −/− | −/− | +/+ |

|  | Composites based on matrix material B Number of mats | | | Composites based on matrix material C Number of mats | | | Composites based on matrix material D Number of mats | | |
|---|---|---|---|---|---|---|---|---|---|
| Type of munition | 5 | 10 | 20 | 5 | 10 | 20 | 5 | 10 | 20 |
| .22 lr | +/+ | +/+ | +/+ | +/+ | +/+ | +/+ | +/+ | +/+ | +/+ |
| 9 × 19 mm Luger | −/− | o/+ | +/+ | −/− | o/+ | +/+ | −/− | o/+ | +/+ |
| .45 ACP | +/o | +/+ | +/+ | +/+ | +/+ | +/+ | +/+ | +/+ | +/+ |
| .44 Magnum | −/− | +/o | +/+ | −/− | +/+ | +/+ | −/− | +/o | +/+ |
| Cal. 12 (Slugs) | −/− | o/+ | +/+ | −/− | +/o | +/+ | −/− | +/+ | +/+ |
| .223 Remington | −/− | −/− | o/+ | −/− | −/− | +/+ | −/− | −/− | +/+ |

The results show that the systems of the invention have distinctly improved stability in relation to high-momentum point loading than the comparative composites or the unconsolidated layered mats.

The invention claimed is:

1. A fiber-plastics composite, consisting of:
   (I) at least one fiber material; and
   (II) a plastics matrix, which is a cured product of a two-component matrix material (IIa) comprising:
      (1) a parent component comprising at least one polycarbonatediol (A) and at least one aliphatic, aromatic, or araliphatic diamine (B) having primary amino groups, secondary amino groups, or both; and
      (2) a hardener component comprising at least one polyisocyanate-modified polyester (C) having from 4 to 15% isocyanate content,
   wherein an amine number of the at least one diamine (B) is from 300 to 500 mg KOH/g.

2. The fiber-plastics composite as claimed in claim 1, wherein an OH number of the at least one polycarbonatediol (A) is from 50 to 500 mg KOH/g.

3. The fiber-plastics composite as claimed in claim 1, wherein the polyisocyanate-modified polyester (C) is a hexamethylene-diisocyanate-modified polyester.

4. The fiber-plastics composite as claimed in claim 1, wherein the polyisocyanate-modified polyester (C) is obtained by a process comprising reacting hexamethylene diisocyanate with a hydroxy-functional aliphatic polyester.

5. The fiber-plastics composite as claimed in claim 4, wherein the hydroxy-functional aliphatic polyester is a polycaprolactone polymer.

6. The fiber-plastics composite as claimed in claim 1, wherein the at least one aliphatic, aromatic, or araliphatic diamine (B) has secondary amino groups.

7. The fiber-plastics composite as claimed in claim 1, wherein the diamine (B) is a secondary diamine comprising amino groups and an aliphatic group (b1) between nitrogen atoms of the amino groups.

8. The fiber-plastics composite as claimed in claim 1, wherein an amine number of the at least one diamine (B) is from 350 to 500 mg KOH/g.

9. The fiber-plastics composite as claimed in claim 1, wherein:

the diamine (B) has the following formula (FII):

$(b2)$-NH-$(b1)$-NH-$(b2)$     (FII);

(b1) is an aliphatic group having from 4 to 30 carbon atoms;

each (b2) is independently —$CH_2CH_2$—CN, —$CH_2CH_2$—C(O)—O—$CH_{2n+1}$, or both; and n if present is from 1 to 6.

10. A process for producing of the fiber-plastics composite as claimed in claim 1, the process comprising:
   (i) contacting the two-component matrix material (IIa) with the at least one fiber material; and then
   (ii) forming the plastics matrix by curing the two-component matrix material (IIa).

11. The process as claimed in claim 10, wherein the curing occurs at a temperature of no more than 80° C.

12. A composition for producing a fiber-plastics composite, the composition consisting of:
   (I) at least one fiber materials; and
   (IIa) a two-component matrix material comprising:
      (1) a parent component comprising at least one polycarbonatediol (A) and at least one aliphatic, aromatic, or araliphatic diamine (B) having primary amino groups, secondary amino groups, or both; and (2) a hardener component comprising at least one polyisocyanate-modified polyester (C) having from 4 to 15% isocyanate content, wherein an amine number of the at least one diamine (B) is from 300 to 500 mg KOH/g.

13. A component, comprising which comprises the fiber-plastics composite of claim 1.

14. A wind turbine rotor blade, a vehicle component, or a safety jacket, comprising the component of claim 13.

15. A method of improving mechanical stability in an article, the method comprising:
incorporating the fiber-plastics composite of claim 1 into an article in need thereof.

16. A fiber-plastics composite, consisting of:
(I) at least one fiber material; and
(II) a plastics matrix, which is a cured product of a two-component matrix material (IIa) comprising:

(1) a parent component comprising at least one polycarbonatediol (A); and (2) a hardener component comprising at least one polyisocyanate-modified polyester (C) having from 4 to 15% isocyanate content, wherein five mats of the fiber plastics composite are capable of withstanding impact of a projectile from a 0.22 long rifle, from a distance of 10 meters and at a bombardment angle of 90°, without penetration or noticeable bulge.

17. The fiber-plastics composite of claim 9, wherein:
(b1) is a cycloaliphatic group having from 6 to 18 carbon atoms; and
each (b2) is —$CH_2CH_2CN$.

18. The fiber-plastics composite of claim 1, wherein a ratio by weight of the at least one fiber material to the two-component matrix material is from 1:1 to 2.5:1.

* * * * *